United States Patent [19]

Van Praet

[11] Patent Number: 5,573,848
[45] Date of Patent: Nov. 12, 1996

[54] ARTICLE AND METHOD FOR APPLYING A TEMPERATURE INDICATING COMPOSITION

[75] Inventor: Dirk J. Van Praet, Willebroek, Belgium

[73] Assignee: NV Raychem SA, Kessel-Lo, Belgium

[21] Appl. No.: 338,559

[22] PCT Filed: May 21, 1993

[86] PCT No.: PCT/GB93/01045

§ 371 Date: Nov. 21, 1994

§ 102(e) Date: Nov. 21, 1994

[87] PCT Pub. No.: WO93/24816

PCT Pub. Date: Dec. 9, 1993

[30] Foreign Application Priority Data

May 22, 1992 [GB] United Kingdom .................. 9210968

[51] Int. Cl.$^6$ ........................................ B32B 7/12
[52] U.S. Cl. ..................... 428/354; 428/343; 428/355; 428/913
[58] Field of Search .................. 428/343, 352, 428/354, 355, 913

[56] References Cited

U.S. PATENT DOCUMENTS

| | | | |
|---|---|---|---|
| 2,027,962 | 1/1936 | Currie | 18/55 |
| 3,007,829 | 11/1961 | Akkeron | 156/8 |
| 3,086,242 | 4/1963 | Cook et al. | 18/1 |
| 3,379,218 | 4/1968 | Conde | 138/99 |
| 3,597,372 | 8/1971 | Cook | 260/4 |
| 3,753,850 | 8/1973 | Brunet | 161/214 |
| 3,816,335 | 6/1974 | Evans | 252/408 |
| 4,096,017 | 6/1978 | Wyke et al. | 156/275 |
| 4,344,909 | 8/1982 | De Blauwe | 264/230 |
| 4,596,732 | 6/1986 | Diaz | 428/913 X |

FOREIGN PATENT DOCUMENTS

| | | | |
|---|---|---|---|
| 0060025 | 9/1982 | European Pat. Off. | G01K 11/12 |
| 0116393 | 8/1984 | European Pat. Off. | B29C 25/00 |
| 0116392 | 8/1984 | European Pat. Off. | B29C 25/00 |
| 0117026 | 8/1984 | European Pat. Off. | B29C 61/06 |
| 0158519 | 9/1992 | European Pat. Off. | B29C 61/06 |
| 2135471 | 12/1972 | France | B41M 5/00 |
| 2444933 | 7/1980 | France | G01K 11/16 |
| 1155470 | 6/1969 | United Kingdom | F16I 47/00 |
| 1211988 | 11/1970 | United Kingdom | C08F 47/00 |
| 1346479 | 2/1974 | United Kingdom | C09J 7/00 |
| 1440524 | 6/1976 | United Kingdom | B32B 1/00 |
| 1511053 | 5/1978 | United Kingdom | C09D 5/26 |
| WO89/10259 | 11/1989 | WIPO | B32B 7/06 |

OTHER PUBLICATIONS

Patent Abstracts of Japan, vol. 9, No. 157 (P0369) (1880), 2 Jul. 1985 (Dainippon Insatsu K.K.).
Patent Abstracts of Japan, vol. 8, No. 246, 21 Jul. 1984 (Nippon Denshin Denwa Kosha).
Jesse H. Day, *Chem. Rev.*, 63, 65 (1963).
Jesse H. Day, *Chem. Rev.*, 68, 649 (1968).
Chapter 14, *Plastics Finishing and Decoration*, Donatas Satas, ed., Van Nostrand Reinhold Co., New York, 1986.

*Primary Examiner*—Daniel Zirker
*Attorney, Agent, or Firm*—Marguerite E. Gerstner; Herbert G. Burkard

[57] ABSTRACT

An article is provided for applying a temperature indicating composition (8) on to the surface of a heat recoverable substrate. The article comprises the following four layers: backing layer (2), release layer (4), indicating composition (8), and heat-activatable adhesive layer (10). The conversion temperature of the temperature indicating composition (8) is higher than the melting temperature of the release layer (4), and the melting temperature of the release layer (4) is the same as or higher than the activation temperature of the adhesive (10).

7 Claims, 1 Drawing Sheet

U.S. Patent Nov. 12, 1996 5,573,848

ARTICLE AND METHOD FOR APPLYING A TEMPERATURE INDICATING COMPOSITION

BACKGROUND OF THE INVENTION

1. Field of the Invention

This invention relates to articles and methods for applying temperature indicating compositions to heat recoverable articles.

2. Introduction to the Invention

Temperature indicating compositions are typically compositions which change color on being heated to a typical, usually well-defined, temperature. The change in color is frequently reversible and associated with a reversible chemical change which occurs at that temperature. Such materials are discussed and reviewed, for example, in two articles by Jesse H. Day in Chem. Rev. 63, 65 (1963) and Chem. Rev. 68, 649 (1968).

Typically temperature indicating compositions are used as warning indicators that a certain maximum safety temperature has been reached or as means whereby a subsequent check will reveal that some critical temperature was attained.

One especially interesting application of temperature indicating compositions has been in the field of heat-recoverable articles. Heat recoverable articles include heat-shrinkable polymeric sleeve described and claimed, for example, in U.S. Pat. Nos. 2,027,962; 3,086,242; 3,597,372; 3,379,218 and British Pat Nos. 1,155,470; 1,211,988 and 1,346,479, and also heat-recoverable articles based on fabrics as described for example in European Patent Publication Nos. 0116393; 0117026, and 0116392. These comprise a recoverable fabric in conjunction with a polymeric matrix formed by laminating a polymeric material to one or both sides of the fabric to render it impervious. Another type of heat-recoverable article is described in British Patent No. 1,440,524 in which an elastomer member such as an outer tubular member is "held out" in a stretched state by a second member, such as an inner tubular member, which upon heating weakens and thus allows the elastomeric member to recover.

These heat-recoverable articles are typically provided with a sealant coating, for example on the inner surface of a heat-shrinkable sleeve, so that a seal is made between the sleeve and a substrate such as a pipe or cable when the sleeve shrinks around it. The sealants are usually mastics or hot-melt adhesives. In such cases, heat is required both to shrink the sleeve and to melt the sealant. The heating may be by an externally applied torch or may be electrically applied, e.g. by forming the sleeve of a conductive polymeric material, or by laminating electrical wires in the Sleeve, as described for example in European Patent Publication No. 158519 (B100COM EPC). Whichever heating means is used it is desirable to ensure that the sleeve does not become too hot to deteriorate it, and yet, on the other hand, it is important that sufficient heat is applied to cause the sealant to melt and flow when in contact with the substrate. It has been proposed therefore in, for example, U.S. Pat. No. 3,816,335; British Pat. No. 1,511,053 and U.S. Pat. No. 4,344,909, to use a suitable temperature indicating composition on the surface of the heat-recoverable article in order to monitor and control the heat during recovery.

Known temperature indicating compositions are typically applied using a solvent. U.S. Pat. No. 4,344,909, for example, describes a temperature indicating composition comprising an organic thermochromic material, e.g. allantoin, a polymeric binder, e.g. an acrylic resin, and an organic solvent, preferably a halogenated, e.g. chlorinated, solvent such as 1,1,1-trichloroethylene and mixtures thereof.

SUMMARY OF THE INVENTION

We have discovered that a completely different technique can usefully be employed to apply a temperature indicating composition to the surface of a heat-recoverable article. The technique uses a hot transfer process similar to that known and used in a different field of technology, that of applying a printed image to plastic bottles and the like.

The known hot transfer process technique involve using heat and pressure to apply a printed image. Typically a heat transfer decal is produced on a wax-coated paper carrier. The word "decal" is the term used in the art to describe a carrier on which the desired printing pattern is prelaminated. A typical decal structure therefore comprises a laminate of the following sequential layers: wax coated paper, a protective lacquer, inks, and an adhesive lacquer. Heat transfer decals are applied to bottles by heating the wax coated paper layer and pressing the laminate against the substrate to be printed (e.g. a bottle). The heat melts the wax, softens the inks and tackifies the adhesive lacquer. Therefore the adhesive sticks to the substrate. Generally the wax splits leaving part of itself over the ink and part on the backing paper layer, which is then discarded. These known hot transfer processes are described, for example, in chapter 14 of "Plastics Finishing and Decoration" edited by Donatas Satas, published by Van Nostrand Reinhold Co (NY) 1986.

The present invention lies in recognizing that the heat transfer processes, known and used for printing onto non-recoverable plastic substrates such as bottles, can be modified and adapted and used in the application of temperature indicating compositions to heat-recoverable substrates.

A first aspect of the present invention provides an article for applying a temperature indicating composition onto the surface of a heat-recoverable substrate comprising:

(i) a backing layer, (ii) a meltable release material mounted on one surface of the backing layer, (iii) a temperature indicating composition, which changes its visual appearance when heated above a pre-selected temperature $T_c$, and (iv) a heat activatable adhesive layer for bonding the temperature indicating composition to a surface of a heat-recoverable article, wherein the temperature indicating composition is positioned between the release material and the adhesive layer, and wherein $T_c$ is higher than the melting temperature $T_{m(rl)}$ of the release material, which is, in turn, the same as, or higher than the activation temperature $T_{a(al)}$ of the adhesive layer.

The second aspect of the present invention provides a method of applying a temperature indicating composition onto the surface of a heat-recoverable substrate, comprising (a) positioning an article according to any preceding claim over the surface of the heat-recoverable substrate, (b) heating the article to a temperature of at least $T_{a(al)}$ to activate the adhesive layer, and thereby secure the article to the surface of the heat-recoverable substrate, then (c) heating the article to a temperature that is at least as high as $T_{m(rl)}$ but is lower than $T_c$, thereby releasing the backing layer from the article, but not effecting the change in visual appearance of the temperature indicating composition.

DETAILED DESCRIPTION OF THE INVENTION

According to the invention part or all of the release layer may be removed with the backing layer. Where only some is removed, a remaining portion may act to protect the temperature indicating composition and the adhesive.

The release material typically comprises a polymeric material. Such material may exhibit a melting temperature range on heating rather than a sharp melting temperature. Therefore for precision it is desirable to specify a particular test for determination of melting temperature. Accordingly the term "melting temperature" of the release material, as used in this specification, means the melting temperature as measured by method C2, which uses Differential Scanning Calorimetry, as described in International Standard ISO 3146. (Ref 1503146-1985 (E)).

Similarly the adhesive layer typically comprises a polymeric material. Its activation temperature is the temperature at which it will adhere to a substrate. This temperature is typically at or dose to the melting temperature of the material. It may be up to 10°–20° C. above the melting point. Therefore where reference is made in the present specification to the activation temperature of the adhesive layer this can be defined as the melting temperature, as measured by ISO 3146 referenced above.

In the method according to the invention $T_{a(al)}$ is preferably lower than $T_{m(rl)}$ and step (b) preferably involves heating the article to a temperature that is at least as high as $T_{a(al)}$ but is lower than $T_{m(rl)}$. In the method pressure is preferably applied to urge the article against the substrate, simultaneously with, or subsequent to, the heating in step (b). Preferably pressures of at least 150N/cm$^2$ are applied. For rubber roller presses, pressures in the range 150–350N/cm$^2$ are preferably applied. For metal presses pressures up to about 1400N/cm$^2$ may be applied. Heat and pressure are preferably applied by the use of hot platens in a manner known to the man skilled in the art of hot processing techniques.

Using the invention, it is therefore possible to apply a temperature indicating composition to a heat-recoverable composition using a hot-pressing technique. The materials for the adhesive layer and the release layer are selected such that premature conversion of the indicating composition does not take place. As mentioned above the indicating compositions are preferably selected for recoverable articles to indicate when recovery is complete and effective melting of sealant/adhesive sleeve linings has taken place. Therefore the indicating composition according to the invention preferably undergoes a visible change in appearance at about the recovery temperature of the recoverable substrate. Therefore, since the materials for the adhesive layer and the release layer are selected such that the process of application of the compositions does not cause premature conversion of the indicating composition, their selection automatically ensures that the process of application of the compositions similarly does not cause premature recovery of the substrate.

The temperature indicating composition of the invention may be present in the article of the invention in any convenient form. It may be a continuous layer, but more usually will be non-continuous, e.g. in a pattern. For example it may be provided as a randomly or uniformly distributed series of dots, as stripes, or as alphanumeric characters, or graphics. Advantageously, for example, information may be presented by the temperature indicating composition, e.g. the origin or size of the substrate or the like.

The release material is preferably present in the form of a continuous layer. Instead, for example, it may be provided in regions that simply cover and preferably slightly overlap the edges of the temperature indicating composition regions. In general, the release layer may be provided in any way sufficient to release the ink when subjected to heat and pressure.

An additional, protective, material may be provided between the temperature indicating composition and the release layer. This can function to protect the temperature indicating composition once applied to the substrate and/or to protect the adhesive layer. The additional protective layer may not be advantageous, for example, where part of the release layer remains over the temperature indicating composition when the backing is released. In the latter case the remaining portion of the release material can provide protection for the temperature indicating composition and the adhesive. It is preferably in the form of a continuous layer, but again may simply cover the temperature indicating composition regions.

According to the invention $T_c$ is higher than $T_{m(rl)}$. Preferably $T_c$ is at least 5° C., especially at least 10° C., more preferably at least 30° C., especially preferably at least 50° C. higher than $T_{m(rl)}$. This temperature difference provides some tolerance in the process for application of the temperature indicating composition, without risking premature conversion of the temperature indicating composition.

Also according to the invention $T_{m(rl)}$ is at least as high, and is preferably higher than $T_{a(al)}$. Preferably $T_{m(rl)}$ is at least 5° C., preferably at least 10° C., more preferably at least 30° C., especially preferably at least 50° C. higher than $T_{a(al)}$. If $T_{m(rl)}$ and $T_{a(al)}$ are approximately the same temperature then release of the temperature indicating composition is substantially simultaneous with its adherence to the substrate. A temperature difference between $T_{m(rl)}$ and $T_{a(al)}$ permits easier handling and application of the temperature indicating composition.

Turning now to the compositions of the various components of the article according to the invention, the backing layer may comprise any material able to withstand the temperatures applied to activate the adhesive and to release the release materials. Typical examples include paper or polyester. Typically the backing layer is 0.01 to 0.04 mm thick.

The release material preferably has a melting point (as hereinbefore defined) in the region 150°–250° C., preferably in the range 170°–230° C. As examples the release material may comprise a hot melt adhesive such as an ethylene vinylacrylate, waxes, resin, or polypropylene. The release material is preferably a thin layer less than 20 microns thick, preferably less than 10 microns thick or even less than 5 microns thick.

The adhesive layer preferably has an activation temperature (as hereinbefore defined) in the range 100°–200° C. Typically it is an adhesive lacquer and comprises a special polyethylene for example EVA, ethylenecoterpolymers, modified polyamides, tackified elastomeric materials (SBS, SIS, PIB, nitrile rubbers) and any other materials which give good adhesion to polyethylene). It is preferably in the form of a layer less than 20 microns thick, preferably less than 10 microns thick or even less than 5 microns thick.

The temperature indicating composition preferably undergoes a change in appearance at a temperature $T_c$ in the range 200°–300° C., preferably in the range 230°–270° C., especially about 250° C. The change in appearance is preferably a visible color change, e.g. green to black.

The protective material, if present, is preferably in the form of a layer. It must be able to withstand heating to temperatures greater than $T_c$ without deleterious effect. Typically the protective layer is less than 20 microns thick, preferably less than 10 microns thick or even less than 5 microns thick.

BRIEF DESCRIPTION OF THE DRAWINGS

Embodiments of the invention will now be described by way of example, with reference to the accompanying drawings, wherein.

DETAILED DESCRIPTION OF THE DRAWINGS

Figure 1:
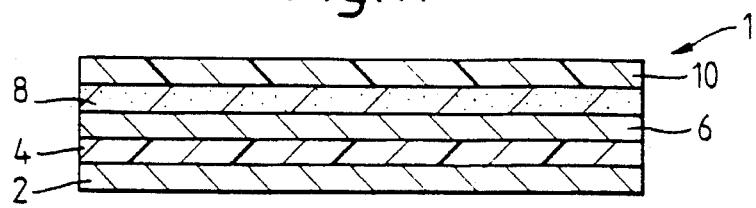
FIG. 1 is a cross-sectional view through an article according to the invention.

Referring now to the drawings, the article 1 of FIG. 1 comprises a laminate structure comprising the following sequential layers: paper backing layer 2, hot melt EVA adhesive release layer 4, protective lacquer layer 6, temperature indicating composition layer 8, and a heat activatable adhesive layer comprising special polyethylene 10. The conversion temperature $T_c$ of the temperature indicating composition 8 is about 250° C. The melting temperature $T_{m(rl)}$ of the release layer 4 is about 200° C., and the activation temperature of the adhesive layer 10 is about 150° C.

Figure 2A:
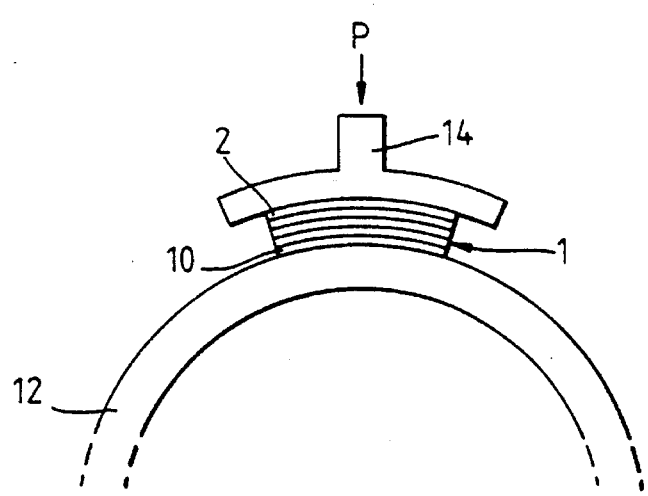
FIGS. 2a and 2b are cross-sectional views showing the article of FIG. 1 being applied to a heat recoverable sleeve.
Figure 2B:
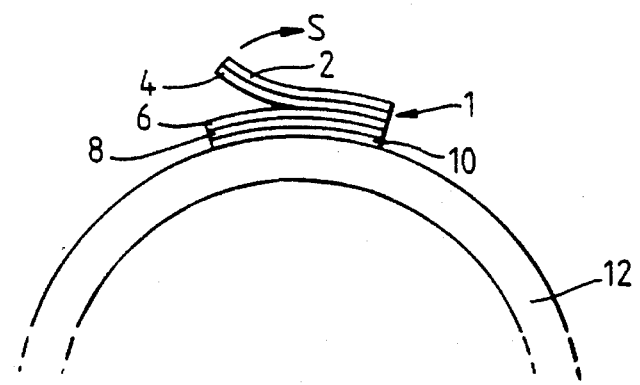

FIGS. 2a and 2b show successive stages in application of the article 1 to the surface of a heat recoverable polymeric sleeve 12. In FIG. 2a the article 1 is placed adjacent the sleeve 12, and a heated platen 14 pressed against the article 1 in a direction as indicated by arrow P. The platen 14 heats the article 1 to a temperature greater than 150° C. thereby activating the adhesive layer 10 to bond the temperature indicating composition 6 (and covering layers 6, 4 and 2) to the sleeve 12. Turning now to FIG. 2b, further heat is then applied, either by heating platens 14 or by other means to raise the temperature above 200° C. (but below 250° C.).

This melts release layer 4, so that it and the backing layer 2 can be removed by pulling, as indicated by arrow S in the drawings. The entire release layer 4 can be removed (as shown) or the layer may split, so that part (an under part) remains over the protecting layer 6, while the remainder is removed with the backing layer 2.

I claim:

1. An article for applying a temperature indicating composition onto a surface of a heat-recoverable substrate comprising:

(i) a backing layer,
   (ii) a meltable release material which (a) is mounted on one surface of the backing layer and (b) has a melting temperature $T_{m(rl)}$,
   (iii) a temperature indicating composition which changes its visual appearance when heated above a pre-selected temperature $T_c$, and
   (iv) a heat activatable adhesive layer for bonding the temperature indicating composition to a surface of a heat-recoverable article, said adhesive layer having an activating temperature $T_{a(al)}$, wherein the temperature indicating composition is positioned between the release material and the adhesive layer, and wherein $T_c$ is higher than the melting temperature $T_{m(rl)}$ of the release material, which is the same as or higher than the activating temperature $T_{a(al)}$ of the adhesive layer.

2. An article according to claim 1, wherein the release material is in the form of a continuous layer.

3. An article according to claim 1, which further comprises a protective material positioned between the temperature indicating composition and the release material.

4. An article according to claim 3 wherein the protective material is in the form of a continuous layer.

5. An article according to claim 1, wherein $T_c$ is at least 10° C. higher than $T_{m(rl)}$.

6. An article according to claim 1, wherein $T_{m(rl)}$ is at least 10° C. higher than $T_{a(al)}$.

7. An article according to claim 2 which further comprises a protective material positioned between the temperature indicating composition and the release material.

* * * * *